US 10,114,862 B2

(12) United States Patent
Krauss (10) Patent No.: US 10,114,862 B2
(45) Date of Patent: Oct. 30, 2018

(54) SUGGESTION OF A BROAD-SPECTRUM LIST OF GROUPED NATURAL LANGUAGE SEARCH QUERY TERMS (71) Applicant: International Business Machines Corporation, Armonk, NY (US)

(72) Inventor: Kirk J. Krauss, Los Gatos, CA (US)

(73) Assignee: International Business Machines Corporation, Armonk, NY (US)

( * ) Notice: Subject to any disclaimer, the term of this patent is extended or adjusted under 35 U.S.C. 154(b) by 275 days.

(21) Appl. No.: 14/473,832

(22) Filed: Aug. 29, 2014

(65) Prior Publication Data

US 2016/0063059 A1 Mar. 3, 2016

(51) Int. Cl.
*G06F 17/30* (2006.01)

(52) U.S. Cl.
CPC .... *G06F 17/30457* (2013.01); *G06F 17/3064* (2013.01)

(58) Field of Classification Search
CPC .................................................. G06F 17/3064
See application file for complete search history.

(56) References Cited

U.S. PATENT DOCUMENTS

| 7,433,883 | B2 | 10/2008 | Jeffrey |
| 7,890,526 | B1 * | 2/2011 | Brewer ............... G06F 17/3064 707/767 |
| 8,612,414 | B2 | 12/2013 | Lee et al. |
| 8,631,004 | B2 | 1/2014 | Mishne et al. |
| 2004/0199498 | A1 * | 10/2004 | Kapur ............... G06F 17/30672 |
| 2007/0050339 | A1 * | 3/2007 | Kasperski ......... G06F 17/30967 |
| 2008/0294619 | A1 | 11/2008 | Hamilton, II et al. |
| 2009/0276417 | A1 * | 11/2009 | Shapira ............. G06F 17/30746 |
| 2011/0173217 | A1 | 7/2011 | Kasperski |
| 2012/0023120 | A1 * | 1/2012 | Kanefsky ............ G06F 17/3064 707/767 |
| 2013/0018872 | A1 | 1/2013 | Velipasaoglu |
| 2013/0166585 | A1 | 6/2013 | Das Sarma et al. |
| 2013/0275453 | A1 | 10/2013 | Vyas et al. |
| 2013/0304757 | A1 | 11/2013 | Gebhard et al. |
| 2013/0332438 | A1 | 12/2013 | Li et al. |
| 2014/0122516 | A1 | 5/2014 | Brewer et al. |

(Continued)

OTHER PUBLICATIONS

Jain et al.; "Open Entity Extraction From Web Search Query Logs", Proceedings of the 23rd International Conference on Computational Linguistics (COLING 2010), Aug. 2010, pp. 510-518.

(Continued)

*Primary Examiner* — Hung Q Pham
(74) *Attorney, Agent, or Firm* — Patterson + Sheridan, LLP (57) ABSTRACT The present disclosure relates to applying entity analytics to a natural language-based search engine. According to one embodiment, a search query having at least a first term is received. One or more second terms having a relationship to the first term is identified based on prior search queries. The relationship indicates that the first term has been observed with the second term in the prior search queries on at least a specified number of occasions over a specified duration. One or more predictive suggestions for completing the search query is generated. Each predictive suggestion includes at least the first term or an identified equivalent of the first term and at least one of the one or more second terms.

13 Claims, 7 Drawing Sheets (56) References Cited

U.S. PATENT DOCUMENTS

2014/0129973 A1    5/2014  Guo et al.
2015/0006564 A1*   1/2015  Tomkins ............. G06F 17/3064
                                                       707/767

OTHER PUBLICATIONS

Pu, Hsiao-Tieh; "Web Relevant Term Suggestion Using Log-Based and Text-Based Approaches", Graduate Institute of Library and Information Studies, National Taiwan Normal University, Dec. 1, 2006, pp. 1-22.

Umagandhi et al.; Time Independent Query Recommendations Using Concept Based User Profile From Search Engine Query Logs, World Applied Sciences Journal 31(5):846-853, ISSN 1818-495, Mar. 18, 2014, pp. 846-853.

List of IBM Patents or Patent Applications Treated as Related.

Kirk J. Krauss; "Suggestion of a Broad-Spectrum List of Grouped Natural Language Search Query Terms", U.S. Appl. No. 14/693,560, filed Apr. 22, 2015.

* cited by examiner

SUGGESTION OF A BROAD-SPECTRUM LIST OF GROUPED NATURAL LANGUAGE SEARCH QUERY TERMS

BACKGROUND

The present disclosure relates to natural language processing, and more specifically, to monitoring search query input to provide predictive search engine query suggestions.

Many search engines include a predictive search feature that suggests a complete search query as a user types search terms in real-time. For example, if the user types the term "star" into the interface and does not submit the query, the interface may present a list of several query suggestions (e.g., in a drop-down box) that include the term "star", such as "star pizza", "star adventures", "stars on ice", and "starfish". The suggestions may be based on how frequently a given word (or phrase) is being searched. To provide meaningful assistance, a set of suggestions may be a short list featuring a broad spectrum of query possibilities, reflecting the range of contexts in which the input terms are used, enabling the user to quickly find sets of terms most relevant to his or her search. Unfortunately, the prior art search term suggestion methods are not always so helpful and can suggest multiple possibilities that are practically redundant with one another.

Typically, predictive search techniques are limited to suggesting queries in which the user input is the first part of the query. Continuing the previous example, although the search engine may present a number of suggestions that begin with the term "star," the search engine is unable to suggest queries such as "neutron star", "movie star", or "crowned with the stars". In addition, current techniques provide suggestions based on semantic analysis. That is, the search engine may determine what to suggest to a user based on a semantic meaning of the word typed by the user. While semantic analysis of relatively short input terms, such as "star", can provide for suggestions of alternate terms, such as "sun", it does not typically provide for interpretations leading to more detailed search queries based on the input terms themselves, such as "brightest star". Thus the need exists for a method for suggesting a broad-spectrum set of search query terms, including relatively detailed suggestions that reflect a range of the various instances in which the input terms or their synonyms may be used.

SUMMARY

One embodiment presented herein includes a method for suggesting a search query based on terms. The method generally includes receiving, via a processor, a search query having at least a first term. One or more second terms having a relationship to the first term are identified based on prior search queries. The relationship indicates that the first term has been observed with the second term in the prior search queries on at least a specified number of occasions over a specified duration. The method also includes generating one or more predictive suggestions for completing the search query, each including both at least the first term or an identified equivalent of the first term and at least one of the one or more second terms.

Another embodiment includes a computer-readable storage medium having instructions, which, when executed on a processor, performs an operation for suggesting a search query based on terms. The operation generally includes receiving, via a processor, a search query having at least a first term. One or more second terms having a relationship to the first term are identified based on prior search queries. The relationship indicates that the first term has been observed with the second term in the prior search queries on at least a specified number of occasions over a specified duration. The method also includes generating one or more predictive suggestions for completing the search query, each including both at least the first term or an identified equivalent of the first term and at least one of the one or more second terms.

Still another embodiment includes a system having a processor and a memory storing a program, which, when executed on the processor, performs an operation for suggesting a search query based on terms. The operation generally includes receiving a search query having at least a first term. One or more second terms having a relationship to the first term are identified based on prior search queries. The relationship indicates that the first term has been observed with the second term in the prior search queries on at least a specified number of occasions over a specified duration. The method also includes generating one or more predictive suggestions for completing the search query, each including both at least the first term or an identified equivalent of the first term and at least one of the one or more second terms.

DETAILED DESCRIPTION

Embodiments presented herein describe techniques for providing query suggestions in a natural language-based search engine while a user inputs a search query. More specifically, embodiments provide techniques that observe occurrences of search query input provided by many search engine users over time, that identify entities corresponding to the search query input, and that identify relationships between such entities.

In one embodiment, a natural language-based search engine includes an entity analytics system that provides search term suggestions in response to search query input. The entity analytics system may evaluate a query term received by the search engine based on a number of occasions in which the entity analytics system observes a term within a specified time duration. The entity analytics system may classify the query terms into entities. For example, assume that the entity analytics system observes "jump rope" as a set of query terms. The entity analytics system may identify "jump", "rope", and "jump rope" as separate entities.

Further, the entity analytics system may identify relationships between observed entities based on occurrences of those entities being grouped with one another as terms in a search query. That is, the entity analytics system need not rely on semantic analysis, ontologies, or other techniques typically used to define or conceptualize terms. Rather, the entity analytics system resolves entity relationships based on frequency of commonly grouped terms appearing with one another, regardless of the order of the terms. Continuing the previous example, if the entity analytics system observes the term "jump" grouped with the term "rope" at a relatively frequent rate, the entity analytics system may classify "jump" as being related to "rope." The entity analytics system also may classify both "jump" and "rope" as being related to the grouped term "jump rope." In some embodiments, relationship resolution can involve yes/no rules that provide determinations as to whether entities are related. In some embodiments, relationship resolution can involve a range of relationship scores that determine the degree of relationship between entities.

In one embodiment, the entity analytics system may score similarity between entities. For example, the entity analytics system may determine that entities "jump rope" and "jumping rope" may have a high degree of similarity based on the relationships of terms "jump" and "jumping" with respect to the term "rope" and also based on other search analytics. Doing so allows the search engine to limit suggestions involving entities with high similarity scores. In this case, if a user inputs "rope" into a search engine interface, the search engine may return either "jump rope" or "jumping rope" as a suggestion, but not both.

The entity analytics system may apply relationship and similarity scores to search queries to provide suggestions. In response to receiving query input, the entity analytics system determines which relationships exist with respect to a given entity. For example, assume a user enters "rope" as a query. The entity analytics system may determine that an entity "rope" has relationships with "jump rope", "twisted rope", and "rope knot", among other relationships. The entity analytics system may return the entities with the highest relationship scores with respect to the query input, and the lowest similarity scores with respect to one another, to the search engine, which presents the terms associated with those entities as suggestions to the user.

Advantageously, applying entity analytics techniques to a natural language-based search engine results in broader suggestions presented to a user. The entity analytics system observes, over time, occurrences of a given word in certain combinations with other words and identifies relationships based on the occurrences. Therefore, a word may relate to other words in different placements within a search query. For example, "rope" may relate to "jump rope", where "rope" is at the end of the query. And "rope" may also relate to "rope burn", where rope is at the beginning of the query. As a result, embodiments allow a search engine to include both "jump rope" and "rope burn" as possible suggestions to a search query for "rope".

Figure 1:
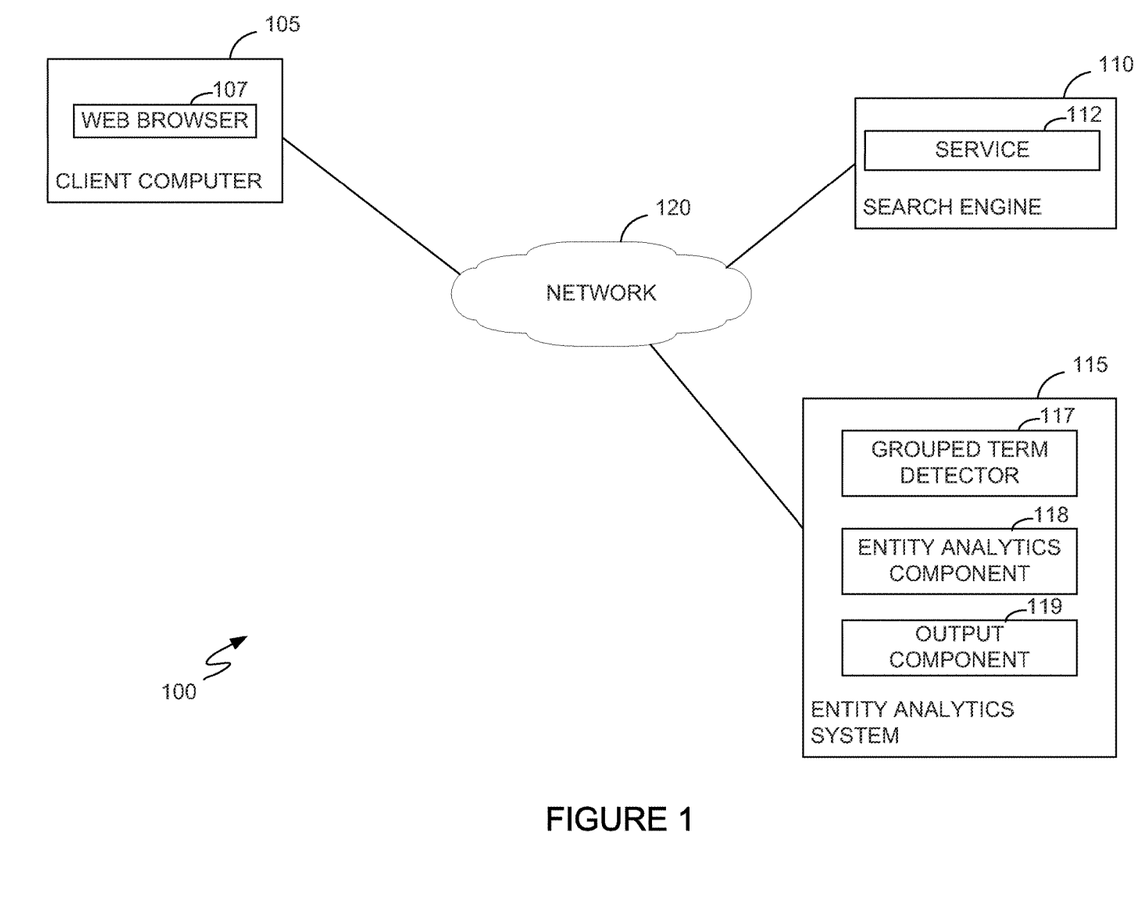
FIG. 1 illustrates an example computing environment, according to one embodiment.

FIG. 1 illustrates an example computing environment 100, according to one embodiment. As shown, the computing environment 100 includes a client computer 105, a search engine 110, and an entity analytics system 115, interconnected via a network 120 (e.g., the Internet).

The client computer 105 may be a personal computer, workstation, mobile device, and the like. Further, the client computer 105 may include a web browser 107. The web browser 107 can access web pages hosted on web servers connected to the network 120. Further, the web browser 107 may access search engine services, such as those provided by search 110, to locate such web pages.

The search engine 110 provides a service 112 that identifies search results (e.g., a ranked list of web pages) from a set of search terms submitted by a user. In some embodiments, the service 112 may be a web-based service that provides a web interface allowing a user to enter (e.g., through the web browser 107) a search query. In other embodiments, the service 112 can expose a search query facility via a client user interface, such as a dedicated Graphical User Interface (GUI). In turn, the service 112 retrieves results related to the query for display to the user. In addition, while a user enters a set of search terms, the service 112 may provide the user, in real-time or based on gestures submitted by the user, with suggested terms to include in the query. For example, assume the user enters the term "rope" into a search engine interface. The service 112 may present several suggestions to the user, such as "rope knot", "rope burn", and "rope a dope". In turn, the user may select from one of the suggestions or otherwise enter a different query. As the user adds more terms to the query, such as "rope supply", the service 112 may further suggest additional queries, such as "rope supply company". The search engine 110 provides suggestions derived via the entity analytics system 115.

In one embodiment, the search engine 110 may apply entity analytics techniques to broaden the suggestions presented to a user, e.g., through the entity analytics system 115. Entity analytics as applied to text is a set of textual and machine learning techniques that detect like and related entities across large, sparse, and disparate collections of data to analyze relationships between words and phrases. The entity analytics system 115 evaluates observed search query terms as entities. An entity represents a term or group of terms that may include "has a", "is a", and other relationships with other entities observed by the entity analytics system 115. A "has a" relationship is one where an entity is a member of another entity. For example, a relationship may specify that a "jump rope" entity has a "jump" entity. Further, an "is a" relationship is one where an entity is identical to another entity. For example, a relationship may specify that a "jumping rope" entity is a "jump rope" entity. The entity analytics system 115 may identify either "has a" or "is a" relationships simply by analyzing observed terms. In some embodiments, semantic analysis or other methods applied to observed terms may assist in entity relationship determination. Of course, the entity analytics system 115 may also determine such entity relationships without the assistance of semantic analysis. For example, the entity analytics system may identify relationships based on the occurrences of a given term being included with other terms in a search query.

The entity analytics system 115 identifies relationships between entities by observing conjoined occurrences, i.e., how often the entity analytics system 115 observes a given set of search terms in conjunction with one another. In addition, the entity analytics system 115 may subject the observations to a specified time duration. That is, terms that are searched for less frequently as time passes are less relevant than terms searched for more frequently, and terms that have not been observed after a specified time interval can be ignored or forgotten. Therefore, to provide relevant suggestions to a user, the entity analytics system 115 may include a duration at which a search query term or set of terms may qualify as an entity. For example, the entity analytics system 115 may be configured to identify entities. Entity analytics techniques allow the search engine 110 to provide a broad variety of suggestions. For example, through the entity analytics techniques, suggestions for a search term "rope" may include additional terms that precede "rope", such as "jump rope" or "knotted rope". Further, through the entity analytics techniques, some suggestions may closely relate to "rope" but not include the term "rope", such as "cord" or "bind".

In one embodiment, the entity analytics system 115 includes a grouped term detector 117, an entity analytics component 118, and an output component 119. Note that the components of entity analytics system 115 are described herein as being part of one system, but each of the grouped term detector 117, entity analytics component 118, and output component 119 may be executed on separate systems. The grouped term detector 117 monitors occurrences of terms in queries submitted to the search engine 110. Further, the grouped term detector 117 tracks occurrences where one given term (or phrase) is observed with another term (or phrase). For example, the grouped term detector 117 may observe the term "jump" and "rope" together, i.e., as "jump rope". If such occurrences occur at a specified frequency and within a specified time window, then the grouped term detector 117 reports the occurrence to the entity analytics component 118. The entity analytics component 118 classifies the observed grouped terms as an entity and identifies relationships between that entity and other entities. Continuing the previous example, the entity analytics component 118 may identify a relationship between the "jump" and "rope" entities, without ascertaining any semantic meaning for each term. That is, the entity analytics component 118 identifies relationships based on how often terms are observed together. The output component 119 may transmit entity and relationship information to the search engine 110. In one embodiment, the output component 119 may generate predictive suggestions based on the identified relationship information and transmit the suggestions to the search engine 110. The search engine 110 can display the predictive suggestions, which include the search terms originally typed by the user or their synonyms or semantic equivalents, and which also include the terms as determined by the relationships identified by the entity analytics component 118. Each of the predictive suggestions displayed by the search engine 110 also may include further terms as determined by other means and is not limited to the terms as determined by an embodiment of present invention. Some predictive suggestions displayed by the search engine 110 may be entirely determined by means other than by an embodiment of the invention, while others are determined entirely or in part by an embodiment of the invention.

Figure 2:
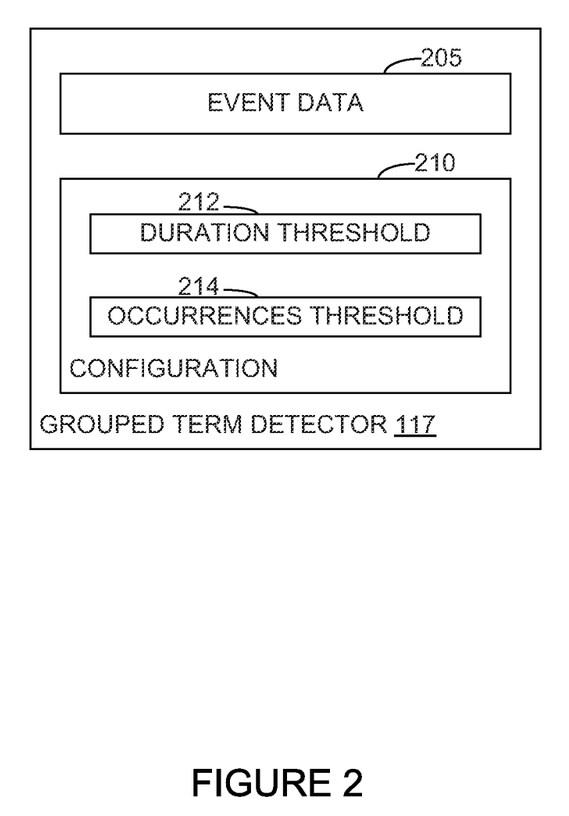
FIG. 2 illustrates a grouped term detector, according to one embodiment.

FIG. 2 further illustrates the grouped term detector 117, according to one embodiment. As shown, the grouped term detector 117 includes event data 205 and a configuration 210. Event data 205 is search query input tracked by the grouped term detector 117. Examples of event data 205 may include observed search terms, timestamps indicating when the search terms were observed, and the like. In one embodiment, the event data 205 is volatile in-memory data. Further, although FIG. 1 depicts the grouped term detector 117 as being a part of a single entity analytics server 115, the grouped term detector 117 may be executed on multiple computer systems and may report its findings to an entity analytics component 118. Under such a configuration, a given term may have affinity with a given compute node operating as part of grouped term detector 117. More specifically, search queries for a particular term may pass through a particular node executing a portion of the processing of grouped term detector 117. To achieve such affinity, in one embodiment, terms starting with a particular letter (or the same first few letters) may be processed to a node of a grouped term detector 117 that is assigned to process terms starting with that letter or letters.

The configuration 210 specifies conditions in which the grouped term detector 117 reports an observed search query to the entity analytics component 118. The configuration 210 may include a duration threshold 212 and an occurrences threshold 214. The duration threshold 212 and the occurrences threshold 214 are configurable values that a given search query meets for the grouped term detector 117 to report to the entity analytics component 118. More specifically, the occurrences threshold 214 is a minimum number of events in which the grouped term detector 117 observes a given term.

The duration threshold 212 is time window in which the grouped term detector 117 observes the term. When the grouped term detector 117 observes a minimum number of occurrences of a term within the duration threshold 212, the grouped term detector reports the term to the entity analytics component 118. The duration threshold 212 and occurrences threshold 214 may be the same for all terms, or these thresholds may be assigned different values for different classes of terms. For example, everyday terms may be assigned a relatively short duration threshold and relatively high occurrences threshold, while more specialized terms, such as scientific, accounting, or legal terms, may be assigned a relatively long duration threshold and a relatively low occurrences threshold. The classes of terms can be determined based on word classifications in dictionaries, or based on the overall popularity of the terms in the search index, or by other means.

The entity analytics component 118 may identify entities associated with the term reported and may further identify "has a", "is a", or other relationships with respect to each entity. The search engine 110 may use the identified relationships to provide suggestions to a user typing a search query in real time. Specifically, if a user types a word into a search engine that corresponds to an identified entity, the search engine 110 may retrieve other terms related to the entity, for display as query suggestions.

Figure 3:
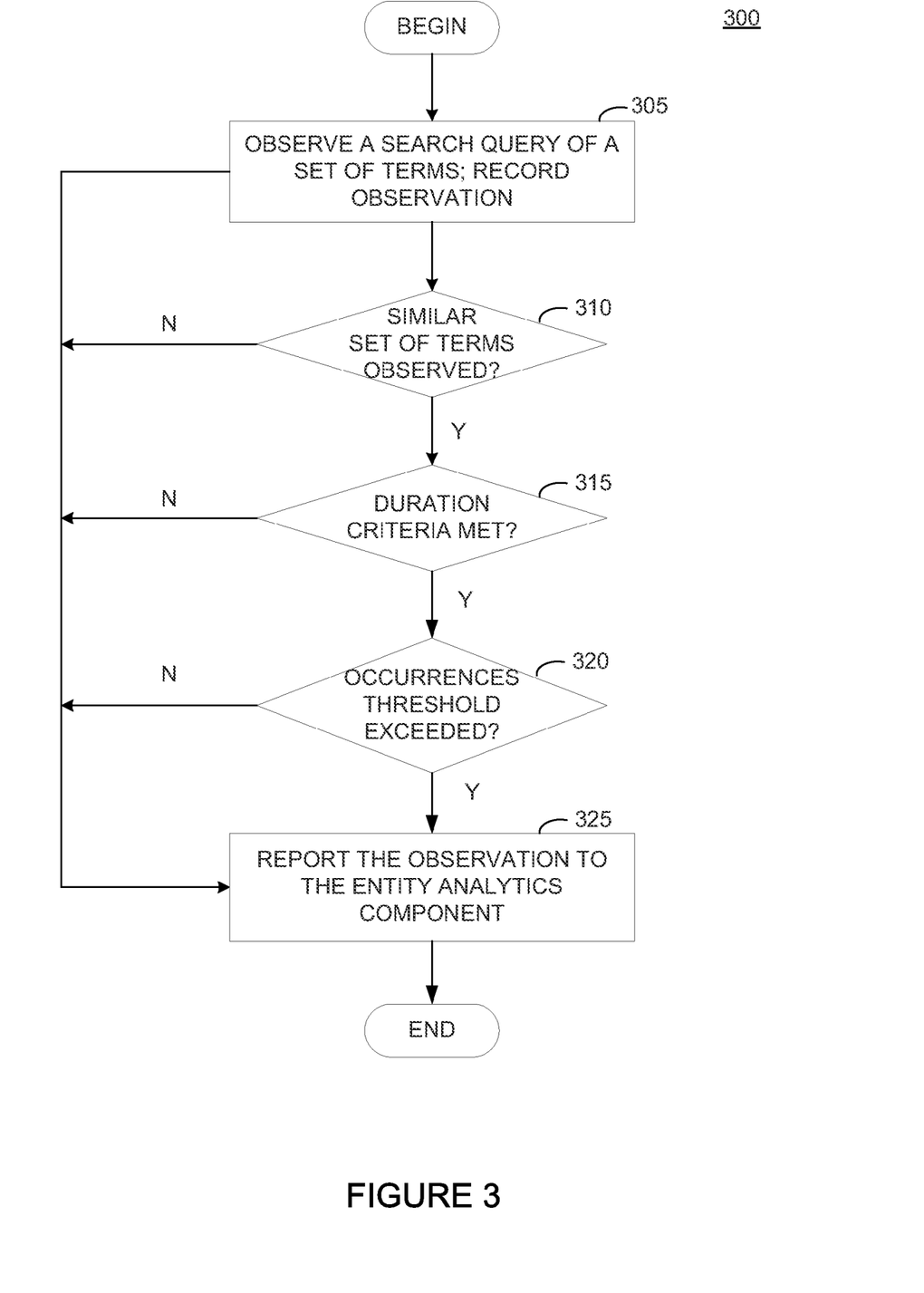
FIG. 3 illustrates a method for reporting observed grouped terms to an entity analytics engine, according to one embodiment.

FIG. 3 illustrates a method 300 for reporting terms to the entity analytics component, according to one embodiment. Method 300 begins at step 305, where the grouped term detector 117 observes a search query and records the observation. The search query may include several terms that may be delimited by spaces, by other characters, by term length counts, or by other means.

After observing the search query, the grouped term detector 117 determines whether the search query meets conditions specified in the configuration 210 of the grouped term detector 117. As previously stated, such conditions in the configuration 210 may include duration and occurrences thresholds that a given search query meets before the grouped term detector 117 reports the term to the entity analytics component 118. At step 310, the grouped term detector 117 determines whether similar terms have been observed previously. To do so, the grouped term detector 117 evaluates the event data 205 to identify whether earlier observations have included the terms of the current search query. If not, then the method 300 ends.

However, if so, at step 315, the grouped term detector 117 determines whether the search query was received within the duration threshold 212. If not, then the method 300 ends. If the grouped term detector 117 received the search query within the specified duration, then at step 320, the grouped term detector 117 determines whether the number of observations of the search query (within the specified duration threshold 212) meets the occurrences threshold 214. If not, then the grouped term detector records the observation in the event data 205.

However, if the observation meets the duration and occurrences criteria, then the grouped term detector 117 reports the observation to the entity analytics component. In one embodiment, the grouped term detector 117 does not report a query more than once per time duration to avoid over-reporting it to the entity analytics component 118. For example, assume that the duration threshold 212 is configured to be one hour and the occurrences threshold 214 is three observations of a given query. Further, consider a case where the grouped term detector receives ten observations of "jump rope" within a time window of a one-hour duration. In this case, the grouped term detector 117 reports the query after the third instance but does not report the remaining seven instances. However, after the hour has expired, the grouped term detector 117 may report further observations of the "jump rope" query to the entity analytics component 118, provided that the occurrences threshold is again met for that query. In one embodiment, the time window is a quantum that provides predefined hour boundaries (e.g., per hour at the beginning of every hour). Continuing the previous example, if all ten observations fall between, e.g., 8:00 AM to 9:00 AM, then the grouped term detector 117 reports one observation of the ten. However, if the observations fall between 8:30 AM and 9:30 AM, then the grouped term detector 117 reports twice (i.e., once for the 8:00 AM-9:00 AM window and another for the 9:00 AM-10:00 AM window).

In one embodiment, the grouped term detector 117 may delete "old" in-memory event data (i.e., event data with associated timestamps occurring earlier relative to the duration threshold 212) to make memory available for incoming event data observations. Doing so allows the process described by method 300 to continue executing without consuming more memory than necessary.

Figure 4:
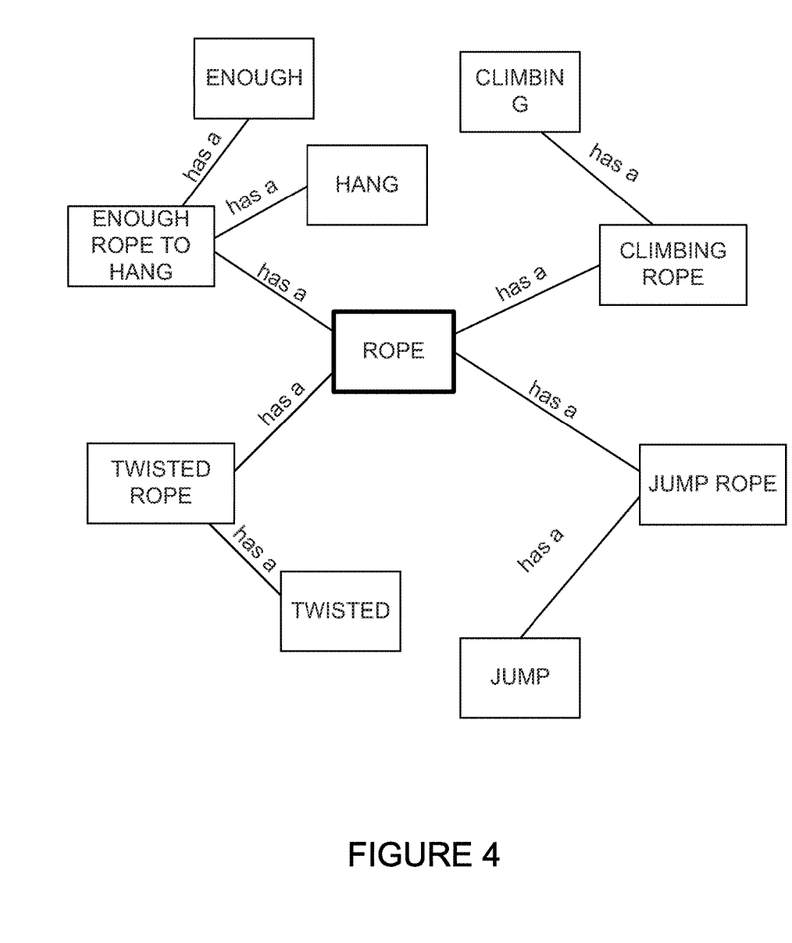
FIG. 4 illustrates an example relationship graph, according to one embodiment.

FIG. 4 illustrates an example relationship graph, according to one embodiment. Illustratively, the graph is an abstraction of "has a" relationships that the entity analytics component 118 identifies, relative to the entity "rope".

Once the grouped term detector 117 reports a search query, the entity analytics component 118 may identify entities in the search query. For instance, assume that the grouped term detector 117 reports an observation of the "jump rope" query from the previous example to the entity analytics component 118. The entity analytics component 118 may identify three entities from the query: "jump", "rope", and "jump rope". FIG. 4 depicts the three entities in the lower-right portion.

As previously stated, the entity analytics component 118 identifies relationships between entities. The grouped term detector 117 enables the entity analytics component 118 to identify relationships based on occurrences of those entities being grouped with one another as terms in a search query. The relationships may indicate that an entity "has a" given entity. That is, an entity may be associated with another entity in the graph illustrated in FIG. 4. Such relationships indicate that the grouped term detector 117 and entity analytics component 118 observe occurrences of these groups of terms together on repeating occasions over time. Illustratively, the relationship graph depicts "rope" as being associated with multiple entities (e.g., "enough rope to hang", "climbing rope", "twisted rope", and "jump rope").

Further, the grouped terms themselves may have "has a" relationships with the words that constitute the grouped terms. For example, the "jump rope" entity relates to both "jump" and "rope". As another example, the entity "enough rope to hang" relates to "enough", "hang", and "rope".

After identifying relationships, the entity analytics component 118 may transmit such entity and relationship information to the output component 119, which may in turn transmit the information to the search engine 110. Either the entity analytics component 118 or the search engine 110 may evaluate the relationship information to generate and rank suggestions in response to real-time user input.

Figure 5:
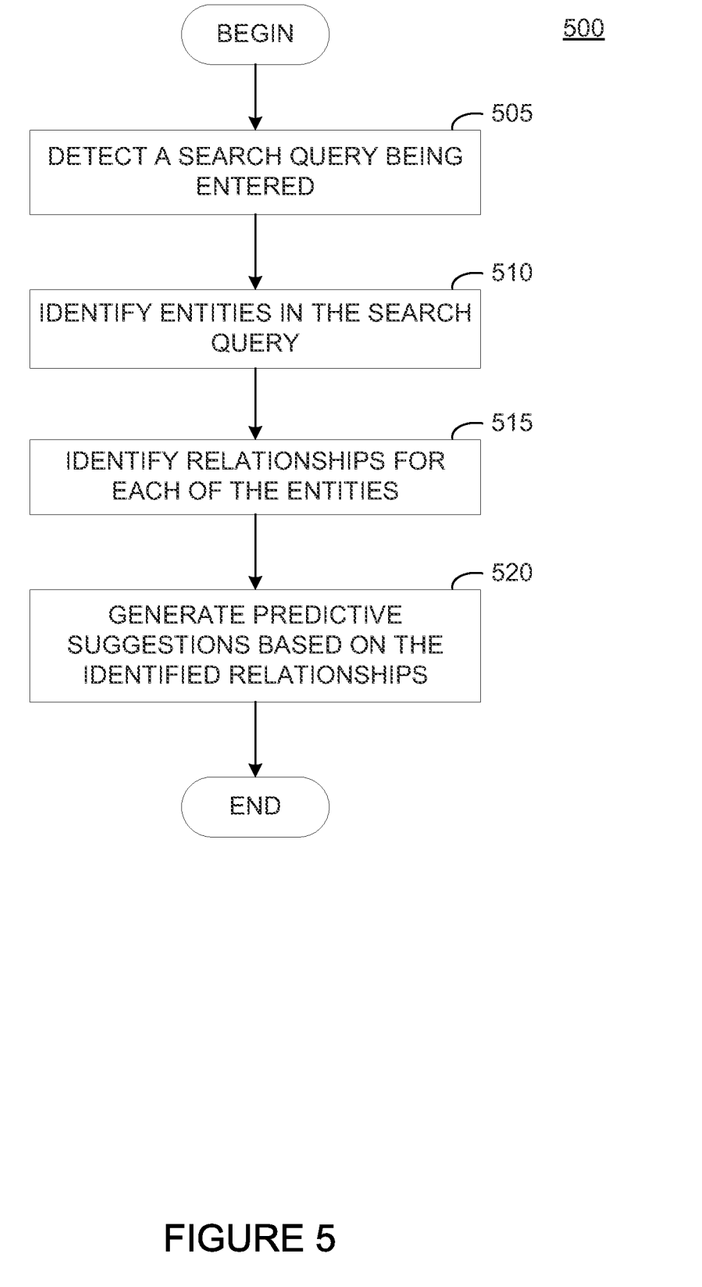
FIG. 5 illustrates a method for generating predictive suggestions based on entity analytics relationships, according to one embodiment.

FIG. 5 illustrates a method 500 for suggesting query terms in response to a user entering a term in a search engine, according to one embodiment. As an example, assume that the entity relationships illustrated in the graph of FIG. 4 are in effect. Method 500 begins at step 505, where the search engine detects a search query being entered in the search engine interface. For example, the search engine may detect a user typing "rope" into a search field of the interface.

The entity analytics system observes the input and, at step 510, identifies entities associated with the search query. In this case, the entity analytics system identifies the entity corresponding to the term "rope". At step 515, the entity analytics system identifies relationships for each of the entities. In this case, the entity analytics system identifies that "rope" has a relationship with "enough rope to hang", "climbing rope", "twisted rope", and "jump rope". In one embodiment, the relationships may be scored based on different metrics, such as one or more of the total number of observations of the terms in combination, the number of such observations within a timeframe, observations of users selecting the combination when it has been presented as a query term suggestion, frequency of observations of the terms in combination as a percentage of the frequency of other observed search queries, similarity or dissimilarity with other candidate query term suggestions, and the like.

The entity analytics system returns information to the search engine. At step 520, the search engine generates predictive suggestions based on the identified relationships. In some embodiments, data about the relationships is returned to the search engine, which goes on to use that information to determine search term suggestions for display. In some embodiments, the entity analytics system determines the suggested search terms and returns them to the search engine for display. In some embodiments, an additional component, such as output component 119, is invoked to determine a score of the suggested search terms. For example, a score for a given suggested search query may be based on how often users have submitted that query to the search engine. If the relationships are scored, the suggestions can be ranked based on the score, and the display can be ordered accordingly. Once the suggestions and their ordering are determined, the search engine may present the suggestions to the user. As previously stated, entities or a relationship between entities may be assigned a score indicating a measure of similarity between entities. For example, the entities "jump rope" and "jumping rope" may score a high degree of similarity based on the relationships of the terms "jump" and "jumping" with respect to the term "rope" (and also based on other search analytics). Assigning these scores allows the search engine to limit suggestions presented for entities having high similarity. That is, in order to give a broad or diverse set of search suggestions, when a group of entities which can be used to provide a suggestion have a high similarity score, the search engine may limit suggestions from the group to one (or a small number) of terms. Continuing the previous example, if a user inputs "rope" into the search engine, the search engine may return either "jump rope" or "jumping rope" as a suggestion, but not both.

Figure 6:
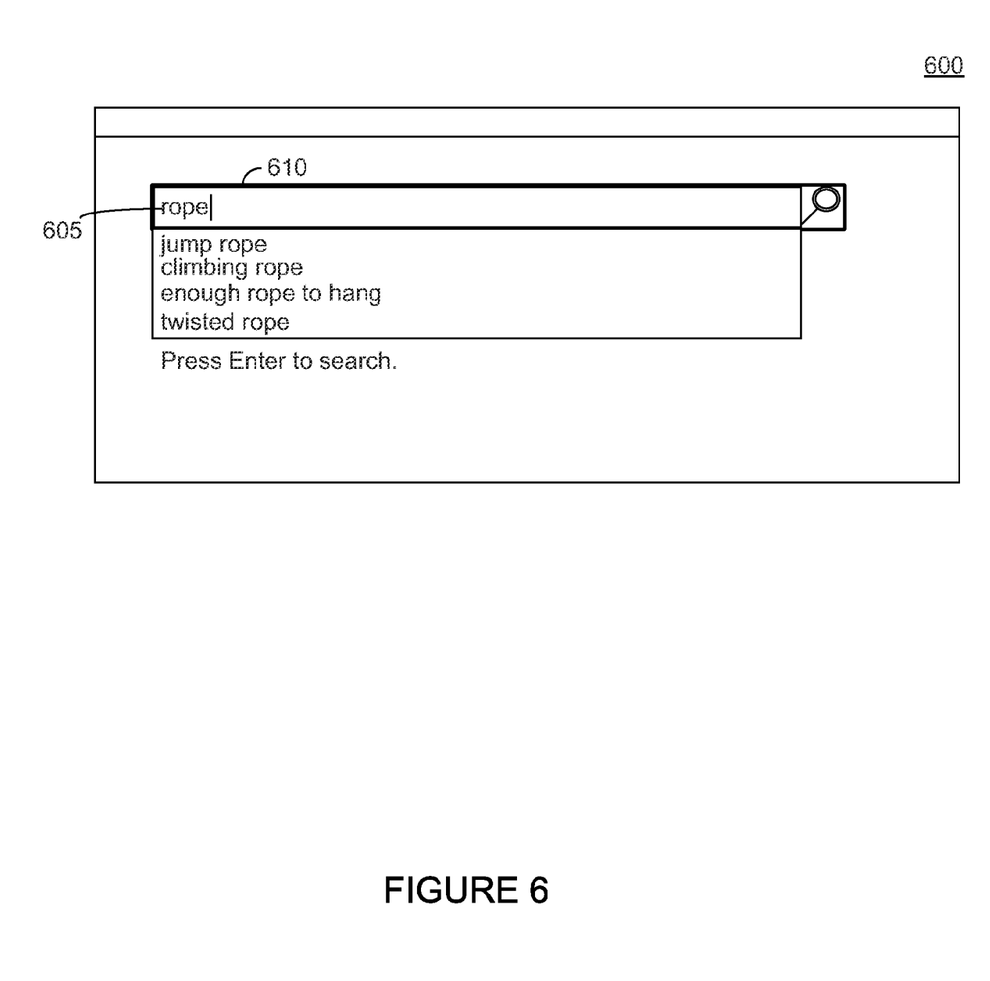
FIG. 6 illustrates an example search interface that presents predictive suggestions, according to one embodiment.

FIG. 6 illustrates an example search interface 600 that presents predictive suggestions to a user, according to one embodiment. Illustratively, the interface 600 depicts the word "rope" 605 being typed into a search field 610, e.g., by a user. Once the user has typed the term, the search engine interface 600 may suggest terms to the user to complete the query, based on the identified entity relationships. As shown, the interface presents "jump rope", "climbing rope", "enough rope to hang", and "twisted rope" as suggestions to the user.

Figure 7:
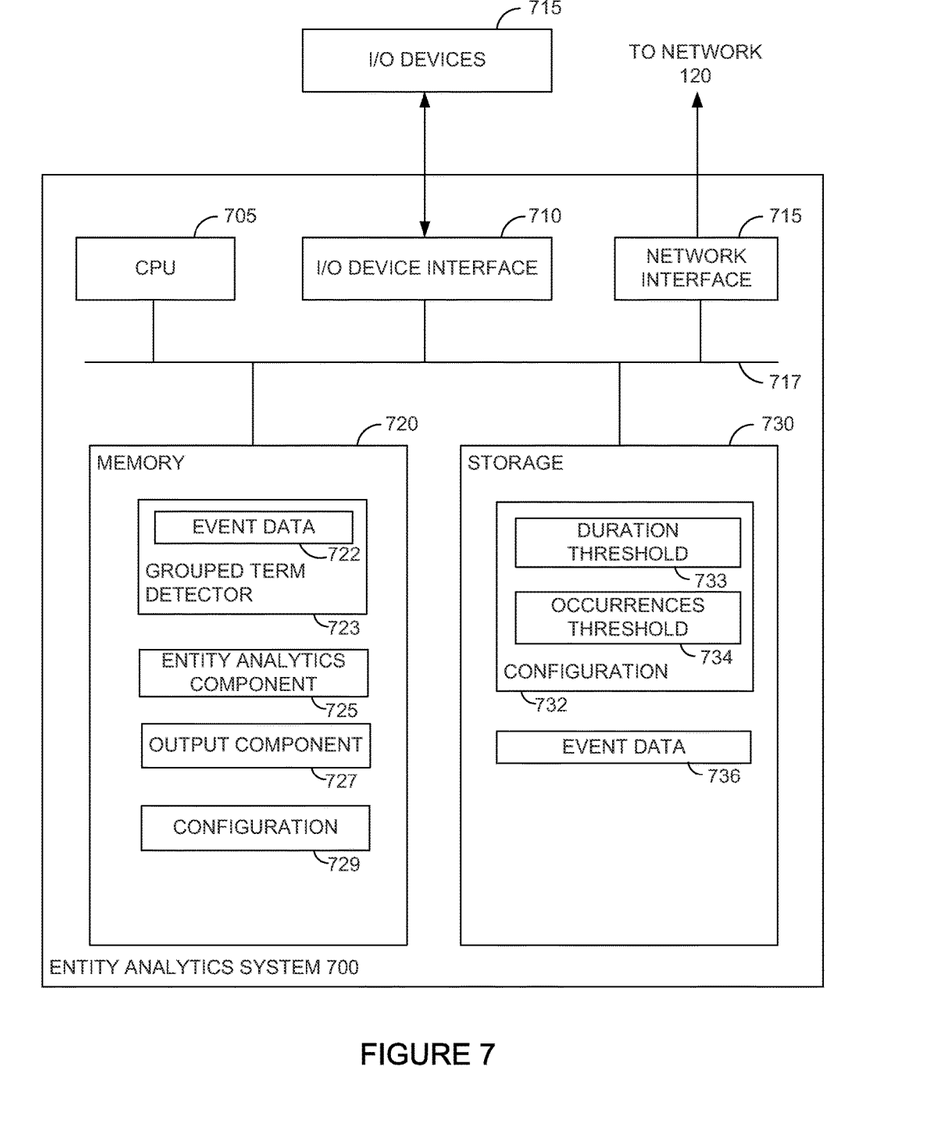
FIG. 7 illustrates an example entity analytics system, according to one embodiment.

FIG. 7 illustrates an example entity analytics system 700 that provides suggestions based on observed search terms, according to one embodiment. As shown, the entity analytics system 700 includes, without limitation, a central processing unit (CPU) 705, a network interface 715, an interconnect (i.e., bus) 717, a memory 720, and storage 730. The entity analytics system 700 also may include an I/O device interface 710 connecting I/O devices 712 (e.g., keyboard, display, and mouse devices) to the entity analytics system 700.

The CPU 705 may retrieve and execute programming instructions stored in the memory 720. Similarly, the CPU 705 may retrieve and store application data residing in the memory 720. The interconnect 717 may facilitate transmission, such as of programming instructions and application data, among the CPU 705, I/O device interface 710, storage 730, network interface 715, and memory 720. CPU 705 is included to be representative of a single CPU, multiple CPUs, a single CPU having multiple processing cores, and the like. Additionally, the memory 720 is included to be representative of a random access memory. Furthermore, the storage 730 may be a disk drive storage device. As shown, the memory 720 includes a grouped term detector 723, an entity analytics component 725, and an output component 727.

Although shown as a single unit, the storage 730 may be a combination of fixed and/or removable storage devices, such as fixed disc drives, floppy disc drives, tape drives, removable memory cards or optical storage, network attached storage (NAS), or a storage area-network (SAN). As shown, the storage 730 includes a grouped term detector configuration 732. The configuration 732 includes a duration threshold 633 and an occurrences threshold 734 persisted from configuration 729 in memory 720.

The grouped term detector 723 observes terms in queries submitted to a search engine and tracks events where a given term is observed with another. Such event data 722 may be persisted in storage 730 (as event data 736). If, for a given set of terms, such events accumulate past the occurrences threshold 734 and within the duration threshold 633, then the grouped term detector 723 reports this finding to the entity analytics component 725. The entity analytics component 725 classifies individual and grouped terms as entities and identifies relationships between the entities. The output component 727 transmits entity and relationship information to a search engine. In one embodiment, the output component 727 may generate predictive suggestions based on the identified relationship information.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud" without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the entity analytics system components) or related data available in the cloud. For example, the grouped term detector 117 could execute on a computing system in the cloud and report search query input to the entity analytics component 118, which may also execute in the cloud. In such a case, the grouped term detector 117 could observe search queries that occur on at least a specified number of occasions within a time duration and record such observations, and any findings with respect to them, at one or more storage locations in the cloud. Doing so allows a user or system, such as the entity analytics component 118, to access this information from any computing system attached to a network connected to the cloud (e.g., the Internet).

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A system, comprising:
   a processor; and
   a non-transitory computer memory storing a program, which, when executed on the processor, performs an operation for suggesting a search query based on terms, the operation comprising:
   receiving a search query having at least a first term;
   identifying a plurality of related terms having a relationship to the first term, based on prior search queries;
   determining to ignore a first related term of the plurality of related terms, based on the first related term having not been observed with the first term over a specified time interval; and
   generating a plurality of predictive suggestions for completing the search query, wherein none of the plurality of predictive suggestions includes the ignored first related term, wherein a first of the plurality of predictive suggestions includes at least the first term, and wherein a second of the plurality of predictive suggestions includes an identified semantic equivalent of the first term and a second related term of the plurality of related terms, wherein the identified semantic equivalent is synonymous with the first term.

2. The system of claim 1, wherein the operation further comprises:
   determining a score for each of the plurality of predictive suggestions based on a number of occasions that the first term has been observed with at least one of the plurality of related terms.

3. The system of claim 2, wherein the operation further comprises:
   ranking the plurality of predictive suggestions based on the score of each predictive suggestion of the plurality of predictive suggestions.

4. The system of claim 1, wherein at least one of the plurality of predictive suggestions specifies a suggested search query that includes at least one of the plurality of related terms preceding the first term.

5. The system of claim 1, wherein the relationship is identified by determining that an entity containing the first term also contains the at least one of the plurality of related terms.

6. The system of claim 1, wherein the identified semantic equivalent of the first term is identified by a measure of similarity with the first term.

7. The system of claim 1, wherein the generating the plurality of predictive suggestions further comprises:
   generating a plurality of potential suggestions; and
   eliminating at least one of the plurality of potential suggestions based on a measure of semantic similarity to at least one other potential suggestion of the plurality of potential suggestions, wherein the measure of semantic similarity indicates that the at least one eliminated potential suggestion is synonymous with the at least one other potential suggestion.

8. A computer program product, comprising:
   a non-transitory computer-readable storage medium having computer-readable program code embodied therewith, the computer-readable program code configured to perform an operation for suggesting a search query based on terms, the operation comprising:
   receiving, via a processor, a search query having at least a first term;
   identifying a plurality of related terms having a relationship to the first term, based on prior search queries;
   determining to ignore a first related term of the plurality of related terms, based on the first related term having not been observed with the first term over a specified time interval; and
   generating a plurality of predictive suggestions for completing the search query, wherein none of the plurality of predictive suggestions includes the ignored first related term, wherein a first of the plurality of predictive suggestions includes at least the first term, and wherein a second of the plurality of predictive suggestions includes an identified semantic equivalent of the first term and a second related term of the plurality of related terms, wherein the identified semantic equivalent is synonymous with the first term.

9. The computer program product of claim 8, wherein the operation further comprises:
   determining a score for each of the plurality of predictive suggestions based on a number of occasions that the first term has been observed with at least one of the plurality of related terms.

10. The computer program product of claim 9, wherein the operation further comprises:
    ranking the plurality of predictive suggestions based on the score of each predictive suggestion of the plurality of predictive suggestions.

11. The computer program product of claim 8, wherein at least one of the plurality of predictive suggestions specify a suggested search query that includes at least one of the plurality of related terms preceding the first term.

12. The computer program product of claim 8, wherein the relationship is identified by determining that an entity containing the first term also contains at least one of the plurality of related terms.

13. The computer program product of claim 8, wherein the generating the plurality of predictive suggestions further comprises:
    generating a plurality of potential suggestions; and
    eliminating at least one of the plurality of potential suggestions based on a measure of semantic similarity to at least one other potential suggestion of the plurality of potential suggestions, wherein the measure of semantic similarity indicates that the at least one eliminated potential suggestion is synonymous with the at least one other potential suggestion.

* * * * *